United States Patent
McKenna

(10) Patent No.: US 9,019,089 B2
(45) Date of Patent: Apr. 28, 2015

(54) USER INTERFACE FOR AN SST

(71) Applicant: NCR Corporation, Duluth, GA (US)

(72) Inventor: Michael McKenna, Dundee (GB)

(73) Assignee: NCR Corporation, Duluth, GA (US)

( * ) Notice: Subject to any disclaimer, the term of this patent is extended or adjusted under 35 U.S.C. 154(b) by 107 days.

(21) Appl. No.: 13/828,808

(22) Filed: Mar. 14, 2013

(65) Prior Publication Data

US 2014/0266645 A1    Sep. 18, 2014

(51) Int. Cl.
| | |
|---|---|
| *H04B 3/36* | (2006.01) |
| *G08B 6/00* | (2006.01) |
| *G06Q 20/18* | (2012.01) |
| *G06F 3/02* | (2006.01) |
| *G06F 17/00* | (2006.01) |
| *G06Q 40/00* | (2012.01) |

(52) U.S. Cl.
CPC . *G08B 6/00* (2013.01); *G06Q 20/18* (2013.01)

(58) Field of Classification Search
USPC .......... 340/407.1; 345/168; 700/232; 705/43
See application file for complete search history.

(56) References Cited

U.S. PATENT DOCUMENTS

| | | | |
|---|---|---|---|
| 2009/0195993 A1* | 8/2009 | Herd .............................. | 361/724 |
| 2012/0223134 A1* | 9/2012 | Smith et al. ................... | 235/379 |
| 2012/0234913 A1* | 9/2012 | Ramachandran et al. .... | 235/379 |
| 2013/0158702 A1* | 6/2013 | Colley .......................... | 700/232 |

\* cited by examiner

*Primary Examiner* — Jack K Wang
(74) *Attorney, Agent, or Firm* — Joseph P. Mehrle

(57) ABSTRACT

The present invention provides a method and apparatus for assisting a user of a Self-Service Terminal (SST). The apparatus provides a user interface for an SST, comprising a media slot for dispensing and/or depositing a media item to a user, a pair of spaced apart edges extending across a substantial portion of the user interface and converging in the vicinity of a transaction activation region to provide a tactile path to assist the user in locating the transaction activation region, and an illuminated guide to provide a visual path to further assist the user in locating the transaction activation region.

13 Claims, 2 Drawing Sheets

USER INTERFACE FOR AN SST

FIELD OF THE INVENTION

The present invention relates to a user interface for a Self-Service Terminal (SST). The invention also relates to a method and apparatus for dispensing or depositing at least one item of media at an SST. In particular, but not exclusively, the present invention relates to a user interface that does not require a display but provides a cue to direct a customer to a port and/or region at which media is dispensed or deposited.

BACKGROUND TO THE INVENTION

One common type of SST is an Automated Teller Machine (ATM).

Although ATMs can perform many different types of transactions, the most common transaction is cash withdrawal. It is therefore desirable to provide a low cost ATM that dispenses cash.

One way to reduce the cost of an ATM is to remove the customer display that is provided to assist the customer in conducting a transaction at the ATM. However, if no customer display is provided then the customer may not be able to use the ATM. For example, the customer may have difficulty in navigating to a specific region of a user interface to initiate a transaction.

SUMMARY OF THE INVENTION

It is an aim of an embodiment of the present invention to at least partly mitigate the above-mentioned problems.

It is an aim of certain embodiments of the present invention to provide a user interface for an SST which assists a user in locating a region of the user interface for initiating a user transaction, wherein the user may be visually and/or hearing impaired.

It is an aim of certain embodiments of the present invention to provide a user interface for an SST which assists a user in locating regions and/or ports of a user interface during a user initiated transaction.

It is an aim of certain embodiments of the present invention to provide a user interface for an SST which indicates to a user a predetermined operating state of the SST and/or a change of operating state of the SST during a user initiated transaction.

It is an aim of certain embodiments of the present invention to provide a user interface for an SST which indicates to a user when a predetermined event has been successfully completed by the user and/or has been successfully started and/or completed by the SST.

According to a first aspect of the present invention there is provided a user interface for a Self-Service Terminal (SST), the user interface comprising:
  a media slot for dispensing and/or depositing a media item to a user;
  a pair of spaced apart edges extending across a substantial portion of the user interface and converging in the vicinity of a transaction activation region to provide a tactile path to assist the user in locating the transaction activation region; and
  an illuminated guide to provide a visual path to further assist the user in locating the transaction activation region.

Aptly, the pair of spaced apart edges are defined by an elongate recessed portion extending between the pair of spaced apart edges for directing a user towards the transaction activation region.

Aptly, the illuminated guide comprises a plurality of illumination devices arranged along the elongate recessed portion.

Aptly, the plurality of illumination devices are arranged along each of the pair of spaced apart edges.

Aptly, the plurality of illumination devices are selectively illuminated in a predetermined sequence to direct a user towards the transaction activation region.

Aptly, the user interface further comprises at least one proximity sensor for sensing the proximity of a user and wherein the illuminated guide is activated in response to the at least one proximity sensor to thereby direct the user to the transaction activation region for initiating a user transaction.

Aptly, the transaction activation region of the user interface comprises at least one sensor for sensing when a user has successfully navigated to the transaction activation region and wherein at least one tactile and/or visual cue is responsive to the at least one sensor to indicate the successful navigation to the user.

Aptly, the transaction activation region comprises a media input opening and/or a media output opening.

Aptly, the transaction activation region comprises a contactless card reader.

Aptly, the user interface further comprises at least one tactile, visual and/or audible cue operable to indicate a predetermined operating state of an SST and/or a change of operating state of an SST during a user initiated transaction.

Aptly, the at least one tactile, visual and/or audible cue is operable to indicate when a predetermined event has been successfully completed by a user and/or has been successfully started and/or completed by the SST.

Aptly, the predetermined event comprises one or more of the following: reading a card, inputting a transaction, depositing at least one media item at the SST, checking and/or confirming an accepted user transaction, notifying of a failed transaction, picking and/or collating media items in response to an accepted user transaction, and/or dispensing at least one media item to a user.

According to a second aspect of the present invention there is provided an SST comprising a user interface, the user interface comprising:
  a media slot for dispensing and/or depositing a media item to a user;
  a pair of spaced apart edges extending across a substantial portion of the user interface and converging in the vicinity of a transaction activation region to provide a tactile path to assist the user in locating the transaction activation region; and
  an illuminated guide to provide a visual path to further assist the user in locating the transaction activation region.

According to a third aspect of the present invention there is provided a method of assisting a user of a Self-Service Terminal (SST), comprising:
  directing a user of an SST to a transaction interaction region of a user interface of the SST by providing:
  a pair of edges extending across a substantial portion of the user interface and converging in the vicinity of a transaction activation region to provide a tactile path to assist the user in locating the transaction activation region; and
  an illuminated guide to provide a visual path to assist the user in locating the transaction activation region.

According to a fourth aspect of the present invention there is provided a user interface for a Self-Service Terminal (SST), comprising:
  at least one transaction activation region of the user interface; and at least one tactile cue and at least one visual cue to direct a user to the at least one transaction activation region of the user interface.

Aptly, the at least one tactile cue comprises a vibrational device and/or a surface of the user interface, and the visual cue comprises an illumination device and/or a surface of the user interface.

Aptly, the surface is provided by at least one raised portion arranged to direct a user towards the at least one transaction activation region.

Aptly, the at least one raised portion is elongate and arranged axially towards the at least one transaction activation region.

Aptly, the at least one raised portion comprises a plurality of spaced apart raised portions.

Aptly, the surface is provided by at least one recessed portion arranged to direct a user towards the at least one transaction activation region.

Aptly, the at least one recessed portion is elongate to define a pair of spaced apart edges extending across a substantial portion of the user interface.

Aptly, the pair of spaced apart edges converges in the vicinity of the transaction activation region.

Aptly, the user interface further comprises a plurality of illumination devices arranged along each edge of the elongate recessed portion.

Aptly, the plurality of illumination devices are operably illuminated in a predetermined sequence to direct a user towards the at least one transaction activation region.

Aptly, the user interface further comprises at least one proximity sensor for sensing the proximity of a user and wherein the at least one visual cue is activated in response to the at least one proximity sensor to thereby direct the user to the at least one transaction activation region of the user interface to start a user transaction.

Aptly, the at least one transaction activation region of the user interface comprises at least one sensor for sensing when a user has successfully navigated to the transaction activation region and wherein at least one tactile and/or visual cue is responsive to the at least one sensor to indicate the successful navigation to the user.

Aptly, the at least one transaction activation region comprises a media input opening and/or a media output opening.

Aptly, the at least one transaction activation region comprises a contactless card reader.

Aptly, the user interface further comprises at least one tactile, visual and/or audible cue for operably indicating a predetermined operating state of the SST and/or a change of operating state of the SST during a user initiated transaction.

Aptly, the at least one tactile, visual and/or audible cue is operable to indicate when a predetermined event has been successfully completed by a user and/or has been successfully started and/or completed by the SST.

Aptly, the predetermined event comprises one or more of the following: reading a card, inputting a transaction, depositing at least one media item at the SST, checking and/or confirming an accepted user transaction, notifying of a failed transaction, picking and/or collating media items in response to an accepted user transaction, and/or dispensing at least one media item to a user.

According to a fifth aspect of the present invention there is provided an SST comprising a user interface, the user interface comprising:

at least one transaction activation region of the user interface; and at least one tactile cue and at least one visual cue to direct a user to the at least one transaction activation region of the user interface.

According to a sixth aspect of the present invention there is provided a method of assisting a user of a Self-Service Terminal (SST) during a user initiated transaction at the SST, comprising:

directing a user of an SST to a transaction interaction region of a user interface of the SST by providing at least one tactile cue and at least one visual cue on the user interface to assist the user in locating the transaction interaction region.

Aptly, the method further comprises:

sensing a user proximate to the SST whilst the SST is in a wait state; and providing the at least one visual cue in response to the sensed proximity of the user to direct the user to the transaction interaction region for starting a user initiated transaction.

Aptly, the method further comprises:

sequentially providing a plurality of tactile and/or visual cues at the user interface to sequentially direct a user to a plurality of transaction interaction regions on the user interface during a user initiated transaction.

Aptly, the method further comprises:

sensing when a user has successfully navigated to the at least one interaction transaction region; and providing at least one tactile and/or visual cue in response to the sensed successful navigation by the user to the interaction transaction region.

Aptly, the method further comprises:

providing at least one tactile and/or visual cue to indicate to a user when a predetermined event has been successfully completed by the user and/or has been successfully started and/or completed by the SST.

Aptly, the predetermined event comprises one or more of the following: reading a card, inputting a transaction, depositing at least one media item at the SST, checking and/or confirming an accepted user transaction, notifying of a failed transaction, picking and/or collating media items in response to an accepted user transaction, and/or dispensing at least one media item to a user.

Aptly, the at least one tactile cue comprises a vibrational cue and/or a surface of the user interface, and the visual cue comprises an illumination and/or a surface of the user interface.

According to a seventh aspect of the present invention there is provided a method of indicating an operating state of an SST during a user initiated transaction, comprising:

providing at least one user cue at a user interface of an SST during a period of time in which the SST is in a predetermined operating state during a user initiated transaction, to thereby indicate a predetermined operating state of the SST to a user during the user initiated transaction.

Aptly, the predetermined operating state comprises one or more of the following: checking/authorizing a transaction, picking/collating media items to be dispensed, collating deposited media items, purging abandoned/erroneous media items, preparing for a new user transaction.

Aptly, the method further comprises:

providing at least one new user cue at the user interface of the SST responsive to the user initiating a change of operating state of the SST during the user initiated transaction, to thereby indicate a new operating state of the SST to the user during the user initiated transaction.

Aptly, the at least one user cue comprises a visual, tactile and/or audible cue.

As used herein, a "user" may comprise a customer at the SST or a service technician who repairs the SST.

According to an eighth aspect of the present invention there is provided a method of guiding a customer through a transaction at an SST user interface that does not include a customer display, the method comprising:
  providing a first visual cue at a token reader;
  reading a token presented by the customer;
  providing a second visual cue at the token reader to indicate to the customer that the token was successfully read by the SST;
  providing a third visual cue at the token reader to indicate to the customer that the SST is authorizing a pre-staged transaction; and
  providing a fourth visual cue at a media dispense region to indicate to the customer that the SST is dispensing media at the media dispense region.

The first visual cue may comprise an active visual cue (for example, an LED) and/or a passive visual cue (for example, one or more edges defined by the user interface).

Each of the four visual cues may be different to the other visual cues, and may comprise different combinations of illuminated LEDs (for example, blinking slowly, blinking quickly, illuminating continuously), different colors of illuminated LEDs (for example, green, amber, or red), and the like.

The method may comprise an initial step of detecting a customer at the SST. The step of providing a first visual cue at the token reader may be performed in response to detecting a customer at the SST.

The method may comprise the further step, after the step of providing a third visual cue at the token reader to indicate to the customer that the SST is authorizing a pre-staged transaction, of providing a further visual cue (different from the other visual cues) indicating to the customer that the pre-staged transaction has been authorized.

The method may comprise the further step of providing a fifth visual cue to a customer in the event that a pre-staged transaction cannot be executed by the SST.

Certain embodiments of the present invention provide the advantage of assisting a user in locating a region of the user interface for initiating a user transaction even when the user is visually and/or hearing impaired.

Certain embodiments of the present invention provide the advantage of assisting a user in locating regions and/or ports of a user interface during a user initiated transaction.

Certain embodiments of the present invention provide the advantage of indicating to a user a predetermined operating state of the SST and/or a change of operating state of the SST during a user initiated transaction.

Certain embodiments of the present invention provide the advantage of indicating to a user when a predetermined event has been successfully completed by the user and/or has been successfully started and/or completed by the SST.

Certain embodiments of the present invention comprise an SST that has a user interface that does not include a customer display so that customers rely on the user cues at the user interface to identify a transaction initiation region (at which a contactless token can be presented, or a card can be inserted) and a transaction fulfilment region (at which media can be dispensed and/or deposited). The contactless token may be a card, a smartphone, or any other device that communicates wirelessly (for example, using RFID, NFC, or any other convenient technology).

BRIEF DESCRIPTION OF DRAWINGS

Embodiments of the present invention will now be described hereinafter, by way of example only, with reference to the accompanying drawings in which.

DESCRIPTION OF EMBODIMENTS

Figure 1:
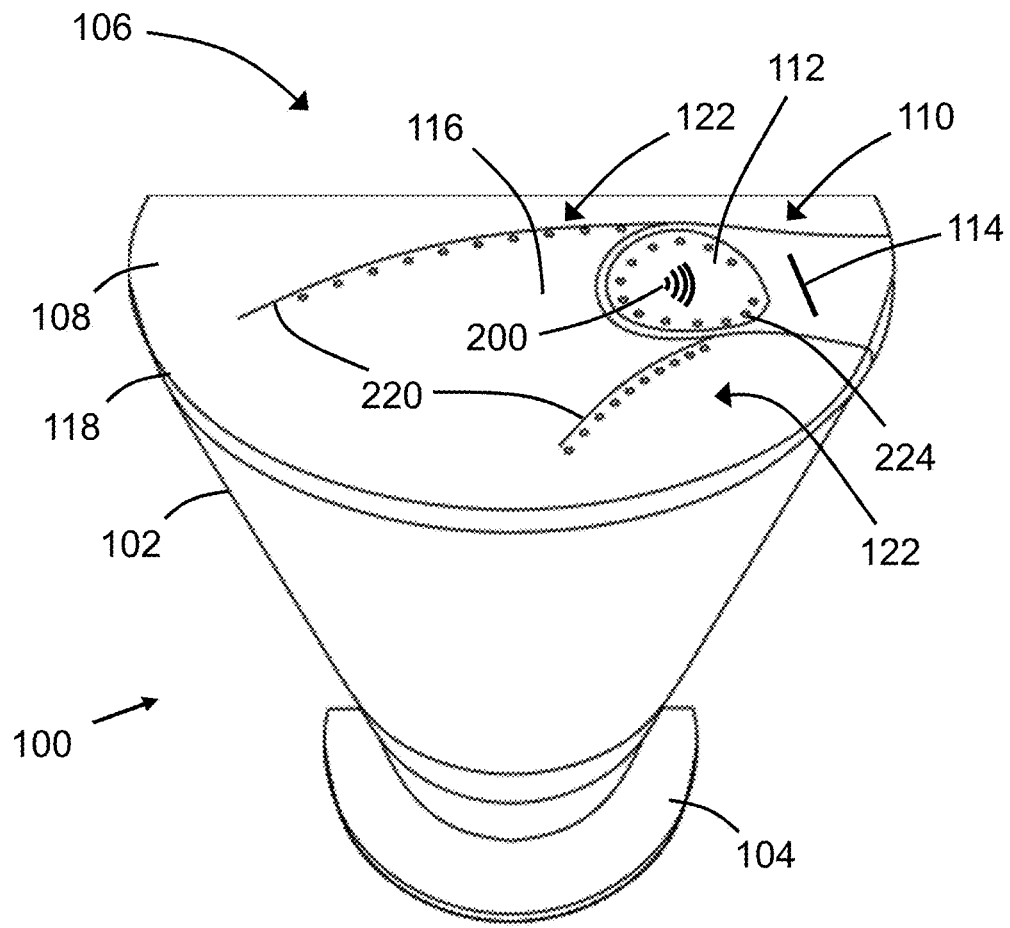
FIG. 1 illustrates an SST including a user interface in accordance with an embodiment of the present invention.

In the drawings like reference numerals refer to like parts.

FIG. 1 illustrates a Self-Service Terminal (SST) in accordance with an embodiment of the present invention. The SST 100 includes a main body 102, a base 104 and a user interface 106 which defines an upper surface 108 of the SST. The user interface 106 includes a transaction activation region 110 which, in the embodiment shown, includes a contactless token reader 112 and a cash dispense slot 114. The user interface 106 also includes a recessed surface 116 which extends from a front edge 118 of the upper surface 108 of the SST 100 to the transaction activation region 110. The recessed surface 116 extends between and defines a pair of spaced apart and curved edges 220 which extend from the front edge 118 of the SST to the transaction activation region 110. A row of illumination devices 122, such as light emitting diodes (LEDs), are provided along each of the spaced apart edges 220. The transaction activation region 110 of the user interface 106 also has an array of LEDs 224 for providing a visual cue to a customer and a vibrational device for providing tactile cues to a customer. The SST further includes a proximity sensor (not shown) for detecting the presence of a customer proximal to the SST 100 and at least one speaker (not shown) for providing audible cues to a customer. The LEDs 122, 224 of the user interface 106 are multicolor LEDs and are equally spaced apart from each other. Their intensity/brightness is variable and a controller (not shown) of the SST 100 is operable to illuminate the LEDs 122,224 in a selective manner in response to a customer initiated transaction and/or predetermined event/state of the SST 100, as will be described below.

It should be appreciated that the SST 100 does not include a customer display or a keypad for inputting transaction information or a personal identification number (PIN). To perform a transaction at this SST 100, the customer first pre-stages a transaction, for example, using an application executing on the customer's cellular telephone (mobile phone or smart phone). This pre-staged transaction can then be executed at the SST 100.

The token reader 112 is operable to read a contactless card or other token. One typical token may be a Near Field Communication (NFC) transceiver incorporated into, or attached to, a customer's mobile phone. This would allow the customer to initiate a pre-staged transaction by tapping his/her mobile phone on or near the token reader 112 and would obviate the requirement for the customer to carry an ATM card.

When the SST is not being used and is in a so-called 'dormant' state, all visual, vibrational and/or audible devices may be in an 'off' state to save power. Alternatively, one or more of the LEDs 122, 224 may illuminate in a predetermined sequence to indicate to a customer that the SST is operational and available for use.

Figure 2A:
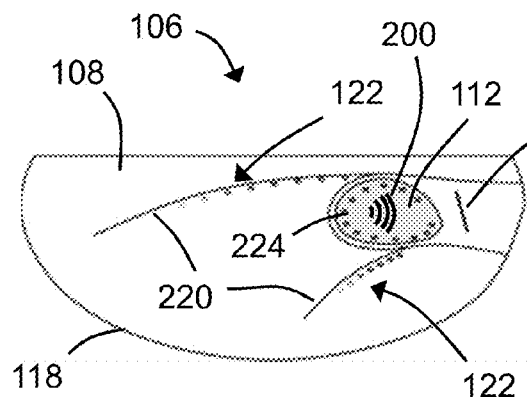
FIG. 2a illustrates a schematic of a portion (a user interface) of the SST of FIG. 1 indicating to a proximal customer that the SST is ready and directing the customer to a region (a contactless token reader) of the user interface.

According to an embodiment of the present invention, as illustrated by FIG. 2a, a proximity sensor (not shown) of the SST 100 detects the presence of a customer at the SST 100 (a proximate customer) and the controller (not shown) changes the state of the SST 100 from a dormant state to an active state.

In response to a proximate customer being detected, the controller (not shown) illuminates LEDs 224 arranged at least partially around the contactless token reader 112 of the user interface 106 in a predetermined sequence to provide, for example, a slow pulsing visual effect for indicating to a customer that the SST 100 is ready for use and for indicating the location of the token reader 112 (the first visual cue). The controller (not shown) also sequentially illuminates LEDs 122 arranged along the pair of spaced apart edges 120 of the recessed surface 116 to direct a user to the contactless token reader 112 for initiating a customer transaction. As shown in FIG. 2a, some of the LEDs 224 around the token reader 112 may be illuminated to neatly join the LEDs 122 arranged along the spaced apart edges 220 to thereby provide a desired visual effect. The LEDs 122, 224 may pulse together, or they may sequentially and progressively illuminate from the front edge 118 to an LED 224 between the token reader 112 and the dispense slot 114, or may selectively illuminate in any desired sequence or fashion. This provides the customer with a first visual cue to guide him/her to the token reader 112.

The contactless token reader 112 also includes an illuminated symbol 200, in this embodiment a standard wireless symbol, to indicate the location and contactless nature of the token reader 112. Alternatively or additionally, an upper surface of the token reader 112 may be fully or partially selectively illuminated by one or more suitably located LEDs to indicate the location of the token reader 112. The LEDs 122, 224 and/or token reader 112 may be green, for example, to indicate a 'ready to go' state of the SST.

The recessed surface 116 of the user interface 106 and the convergence of the curved spaced apart edges 120 aid a visually impaired customer towards the contactless token reader 112. A vibrational device located at the transaction activation region (also referred to as a transaction initiation region) also aids a visually impaired customer in navigating to the contactless token reader 112 by providing a tactile cue.

Figure 2B:
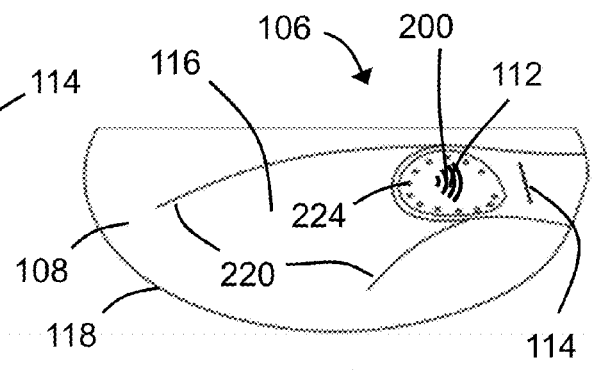
FIG. 2b illustrates the user interface of FIG. 2a indicating that the customer's token has been read by the SST.

As illustrated in FIG. 2b, the LEDs 224 around the contactless token reader 112 blink on and off for a predetermined period of time to confirm when a customer's token has been read to initiate a customer transaction. This provides a second visual cue. The speaker (not shown) also sounds to confirm wireless communication has been made between a customer's token and the token reader 112.

Figure 2C:
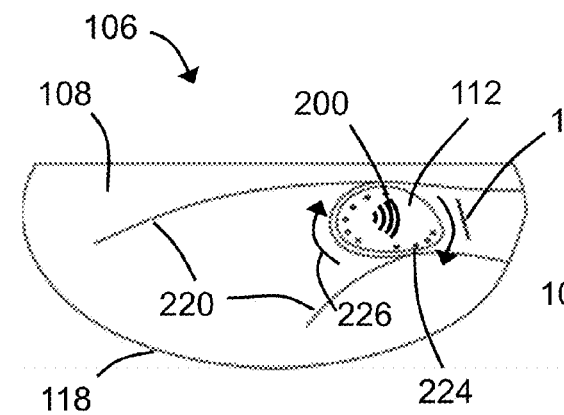
FIG. 2c illustrates the user interface of FIG. 2b indicating to the customer that the SST is authorizing the customer's transaction.

As illustrated in FIG. 2c, the LEDs 224 around the contactless token reader 112 sequentially illuminate in a circling manner, as shown by arrows 226, to indicate the SST 100 is authorizing the customer's transaction. The LEDs 224 and/or token reader 112 may be amber, for example, to indicate a 'thinking' state whilst a transaction is being authorized. This provides a third visual cue.

Figure 2D:
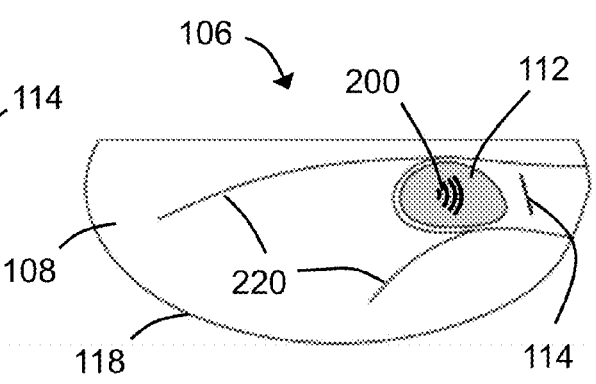
FIG. 2d illustrates the user interface of FIG. 2c indicating to the customer that the SST has authorized the customer's transaction.

As illustrated in FIG. 2d, the token reader 112 is lit solidly and blinks a few times to indicate to a customer that their token has been read successfully and the transaction has been authorized. This provides a further visual cue. The speaker (not shown) also sounds to confirm a successful and authorized transaction. The customer may then put the token away.

Figure 2E:
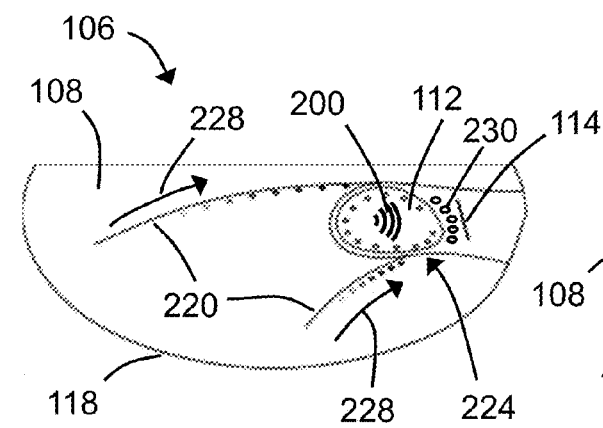
FIG. 2e illustrates the user interface of FIG. 2d indicating to the customer that cash is being dispensed or has been dispensed and the location of the dispensed cash.

As illustrated in FIG. 2e, the LEDs 122 arranged along the pair of spaced apart edges 220 sequentially illuminate towards the cash dispense slot 114 in a 'landing strip' fashion, as shown by arrows 228, to indicate to a customer that cash is being dispensed or has been dispensed and to direct the customer to the location of their dispensed cash. The controller (not shown) also illuminates the cash dispense slot/region 114 to indicate the location of the dispensed cash and the controller (not shown) may also vibrate the cash dispense slot/region 114 to aid a visually impaired customer to navigate to their dispensed cash. A plurality of LEDs 230 arranged along an edge of the dispense slot region 114 also illuminate to neatly join the LEDs 122 arranged along the spaced apart edges 220. This provides a fourth visual cue.

The speaker (not shown) may also sound to indicate cash is being or has been dispensed and is ready to take from the dispense slot 114. For example, a sound of cash being counted or a typical 'kerching' sound may be audible to indicate cash is being dispensed or has been dispensed at the dispense slot 114.

Figure 2F:
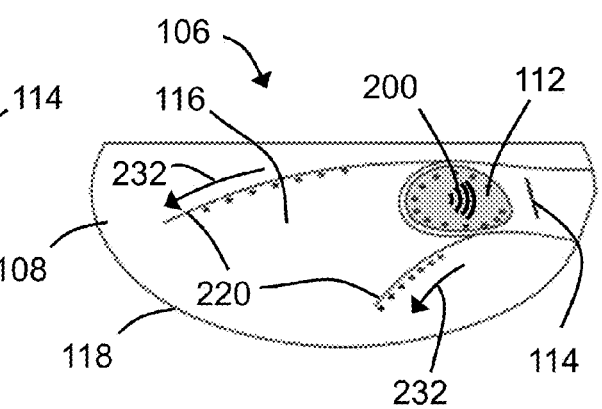
FIG. 2f illustrates the user interface of FIG. 2c indicating to the customer that the customer's transaction has not been authorized.

As illustrated in FIG. 2f, the token reader 112 is lit solidly and the LEDs 122 along the pair of spaced apart edges 220 sequentially illuminate away from the cash dispense slot 114, as shown by arrows 232, to indicate to a customer that the transaction has not been successful. This provides a fifth visual cue.

The controller (not shown) emits a typical 'failure' sound, like an electronic 'crash', from the speaker to indicate a failed transaction as an audible cue to both visually impaired and visually unimpaired customers.

The SST 100 then returns to the state as described above with reference to FIG. 2a to direct the customer to the token reader 112 for reattempting to initiate a customer transaction.

It should be appreciated that whenever an LED is described above as being lit, blinking, or illuminated, or the speaker is described as sounding, it is the controller (not shown) that is controlling the LED or speaker.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A user interface for a Self-Service Terminal (SST), the user interface comprising:
    a media slot for dispensing and/or depositing a media item to a user;
    a pair of spaced apart edges extending across a substantial portion of the user interface and converging in the vicinity of a transaction activation region to provide a tactile path to assist the user in locating the transaction activation region, and wherein the pair of spaced apart edges is defined by an elongate recessed portion extending between the pair of spaced apart edges for directing a user towards the transaction activation region; and
    an illuminated guide to provide a visual path to further assist the user in locating the transaction activation region.

2. The user interface as claimed in claim 1, wherein the illuminated guide comprises a plurality of illumination devices arranged along the elongate recessed portion.

3. The user interface as claimed in claim 1, wherein the plurality of illumination devices are arranged along each of the pair of spaced apart edges.

4. The user interface as claimed in claim 1, wherein the plurality of illumination devices are selectively illuminated in a predetermined sequence to direct a user towards the transaction activation region.

5. The user interface as claimed in claim 1, further comprising at least one proximity sensor for sensing the proximity of a user and wherein the illuminated guide is activated in response to the at least one proximity sensor to thereby direct the user to the transaction activation region for initiating a user transaction.

6. The user interface as claimed in claim 1, wherein the transaction activation region of the user interface comprises at least one sensor for sensing when a user has successfully navigated to the transaction activation region and wherein at least one tactile and/or visual cue is responsive to the at least one sensor to indicate the successful navigation to the user.

7. The user interface as claimed in claim 1, wherein the transaction activation region comprises a media input opening and/or a media output opening.

8. The user interface as claimed in claim 7, wherein the transaction activation region comprises a contactless token reader.

9. The user interface as claimed in claim 1, wherein the user interface further comprises at least one tactile, visual and/or audible cue operable to indicate a predetermined operating state of an SST and/or a change of operating state of an SST during a user initiated transaction.

10. The user interface as claimed in claim 9, wherein the at least one tactile, visual and/or audible cue is operable to indicate when a predetermined event has been successfully completed by a user and/or has been successfully started and/or completed by the SST.

11. The user interface as claimed in claim 10, wherein the predetermined event comprises one or more of the following: reading a token, receiving a transaction, receiving at least one deposited media item at the SST, checking and/or confirming an accepted user transaction, notifying a user of a failed transaction, picking and/or collating media items in response to an accepted user transaction, and/or dispensing at least one media item to a user.

12. A method of assisting a user of a Self-Service Terminal (SST), comprising the steps of:
    via a pair of edges extending across a substantial portion of a user interface of an SST wherein the pair of edges converge in the vicinity of a transaction activation region of the user interface, providing a tactile path to assist a user in locating the transaction activation region; and
    via an illuminated guide of the user interface, providing a visual path to assist the user in locating the transaction activation region;
    to thereby direct the user of the SST to the transaction interaction region of the user interface of the SST.

13. A method of guiding a customer through a transaction at an SST user interface that does not include a customer display, the method comprising:
    providing a first visual cue at a token reader;
    reading a token presented by the customer;
    providing a second visual cue at the token reader to indicate to the customer that the token was successfully read by the SST;
    providing a third visual cue at the token reader to indicate to the customer that the SST is authorizing a pre-staged transaction; and
    providing a fourth visual cue at a media dispense region to indicate to the customer that the SST is dispensing media at the media dispense region.

* * * * *